(12) United States Patent
Rimer et al.

(10) Patent No.: US 8,176,071 B2
(45) Date of Patent: May 8, 2012

(54) SELECTION AND SORTING PROTOCOL EXTENSIONS TO THE WS-ENUMERATION PROTOCOL

(75) Inventors: Matthew S. Rimer, Kirkland, WA (US); Elisa W. Zhang, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 370 days.

(21) Appl. No.: 12/471,080

(22) Filed: May 22, 2009

(65) Prior Publication Data

US 2010/0299377 A1 Nov. 25, 2010

(51) Int. Cl.
*G06F 7/24* (2006.01)
(52) U.S. Cl. .......... 707/769; 707/753
(58) Field of Classification Search .......... 707/753, 707/769
See application file for complete search history.

(56) References Cited

U.S. PATENT DOCUMENTS

| 7,542,990 | B2* | 6/2009 | Paval ............................ 1/1 |
| 2004/0181443 | A1* | 9/2004 | Horton et al. .................. 705/8 |
| 2005/0108153 | A1* | 5/2005 | Thomas et al. ................. 705/39 |
| 2005/0278327 | A1* | 12/2005 | Cipriano et al. ............... 707/7 |
| 2006/0031264 | A1 | 2/2006 | Bosworth et al. |
| 2007/0294282 | A1 | 12/2007 | Cruver |
| 2008/0082980 | A1* | 4/2008 | Nessland et al. .............. 718/104 |
| 2008/0172482 | A1 | 7/2008 | Shah |
| 2008/0263638 | A1 | 10/2008 | McMurtry et al. |
| 2009/0222480 | A1* | 9/2009 | Copeland et al. ......... 707/103 R |

OTHER PUBLICATIONS

"Identity Management Extensibility", Retrieved at <<http://blogs.msdn.conn/imex/default.aspx>>, Feb. 12, 2009, pp. 13.
"WS-Enumeration and WS-Transfer Published as Web Services Messaging Specifications", Retrieved at <<http://xml.coverpages.org/ni2004-09-17-a.html, Mar. 17, 2006, pp. 8.
"[MS-WSDS]: WS-Enumeration: Directory Services Protocol Extensions", Retrieved at <<http://download.microsoft.com/download/9/5/E/95EF66AF-9026-4BB0-A41D-A4F81802D92C/%5BMS-WSDS%5D.pdf>>, 2009, pp. 1-42.
"6 Appendix A: WSDL", Retrieved at <<http://msdn.microsoft.com/en-us/library/dd340122(PROT.10).aspx>>, Feb. 12, 2009, pp. 2.
Song, et al., "An Automated Generation of XForms Interfaces for Web Services", Retrieved at <<http://ieeexplore.ieee.org/ielx5/4279552/4279553/04279681.pdf?tp=>>, 2007 IEEE International Conference on Web Services (ICWS 2007), pp. 8.

* cited by examiner

*Primary Examiner* — James Trujillo
*Assistant Examiner* — Soheila Davanlou
(74) *Attorney, Agent, or Firm* — Merchant & Gould P.C.

(57) ABSTRACT

Techniques are described herein for providing protocol extensions to the WS-Enumeration protocol. A selection protocol extension to the WS-Enumeration protocol enables retrieval of partial representations of objects from a directory server. The partial representations include attributes of the objects that are designated via the selection protocol extension. A sorting protocol extension to the WS-Enumeration protocol enables sorting of objects (or partial representations thereof) to be retrieved from a directory server. The selection and sorting protocol extensions are defined in respective XML elements that are distinct from an XML element that defines an object request including a query filter for selecting objects in the directory server. The selection and sorting protocol extensions may be used independently from each other. The computer languages utilized by the aforementioned XML elements need not necessarily be the same. For instance, a different computer language may be used for each.

18 Claims, 11 Drawing Sheets

SELECTION AND SORTING PROTOCOL EXTENSIONS TO THE WS-ENUMERATION PROTOCOL

BACKGROUND

Directory services exist in the form of software systems that store, organize, and provide access to information in a directory. As used herein, the term directory generally refers to a plurality of objects that are organized in a logical and hierarchical manner. Various protocols exist by which clients may interact with a directory service to perform operations with respect to objects in a directory, such as creating, deleting, updating, or running queries against objects in the directory. For example, the Lightweight Directory Access Protocol (LDAP) is a protocol by which clients may interact with a directory service over a transmission control protocol (TCP) connection. In accordance with such protocols, directories are often configured to include a tree of directory objects. Each directory object usually consists of a set of attributes. An attribute has a name (an attribute type or attribute description) and one or more values. The attributes are defined in a schema.

It may be deemed desirable to implement systems in which clients can interact with a remote directory service, such as an LDAP-style directory service, over a network using industry standard Web services protocols. For example, it may be deemed desirable to enable clients to interact with a remote directory service using industry standard Web services protocols that represent objects using Extensible Markup Language (XML). Examples of such Web services protocols include, for example, SOAP-based protocols such as WS-Enumeration.

SOAP, which was originally defined as Simple Object Access Protocol, is a protocol specification for exchanging structured information in the implementation of Web services in computer networks. SOAP relies on XML for its message format, and usually relies on other application layer protocols (most notably Hypertext Transfer Protocol (HTTP)) for message negotiation and transmission. SOAP can form the foundation layer of a Web services protocol stack, providing a basic messaging framework upon which Web services can be built.

WS-Enumeration describes a SOAP-based protocol for enumerating a sequence of XML elements. WS-Enumeration enables an application to provide an enumeration message to a Web service, requesting a representation of all objects that match designated criteria. The Web service responds to the enumeration message with an enumeration context, which may then be used by the application to retrieve the objects that match the designated criteria. In this way, WS-Enumeration is useful for reading event logs, message queues, streaming, or other applications for which a simple single-request/single-reply metaphor may be insufficient for transferring large data sets over SOAP. However, in conventional WS-Enumeration implementations, when objects are retrieved the objects are provided to the application in an arbitrary order. Moreover, each retrieved object may include attributes that are not needed by the application. WS-Enumeration is described at http://www.w3.org/Submission/WS-Enumeration.

SUMMARY

Systems, methods, and computer program products are described herein for providing protocol extensions to the WS-Enumeration protocol. A selection protocol extension to the WS-Enumeration protocol enables retrieval of partial representations of objects from a directory server. These partial representations are also referred to as object fragments and/or "resources." The partial representations include attributes of the objects that are designated via the selection protocol extension. A sorting protocol extension to the WS-Enumeration protocol enables sorting of objects (or partial representations thereof) to be retrieved from a directory server. The selection and sorting protocol extensions are defined in respective extensible markup language (XML) elements that are distinct from an XML element that defines an object request including a query filter for selecting objects in the directory server. The selection and sorting protocol extensions may be used independently of each other. The computer languages utilized by the XML element that defines the object request and the XML elements corresponding to the selection and sorting protocol extensions need not necessarily be the same. For instance, a different computer language may be used for each.

The sorting protocol extension may enable sorting of objects (or partial representations thereof) based on one or more specified attributes of the objects. The specified attribute(s) may (or may not) be included in attribute(s) of the objects designated in accordance with the selection protocol extension. The objects (or partial representations thereof) may be sorted in ascending or descending order based on the specified attribute(s). The sorting may be performed on a per attribute basis. For instance, the sorting may be performed in ascending order with respect to a first specified attribute and in descending order with respect to a second specified attribute.

In an example method, an object request is provided to a directory server using a first XML element that includes a query filter to select directory object(s) based on a criterion in accordance with a simple object access protocol-based (SOAP-based) Web service protocol. A selection request is provided to the directory server using a second XML element that is distinct from the first XML element to select attribute(s) of each of the directory object(s) to be received as respective resource(s) in response to the object request.

In another example method, an object request is provided to a directory server using a first XML element that includes a query filter to select directory object(s) based on a criterion in accordance with a SOAP-based Web service protocol. A sorting request is provided to the directory server using a second XML element that is distinct from the first XML element to sort the directory object(s) to be received in response to the object request.

In yet another example method, an object request is received at a directory server. The object request uses a first XML element including a query filter to select directory object(s) based on a criterion in accordance with a SOAP-based Web service protocol. A selection request is received at the directory server. The selection request uses a second XML element that is distinct from the first XML element to select attribute(s) of each of the directory object(s). The attribute(s) of each of the directory object(s) are transmitted as respective resource(s) to the entity in response to receiving the object request and the selection request.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

Figure 1:
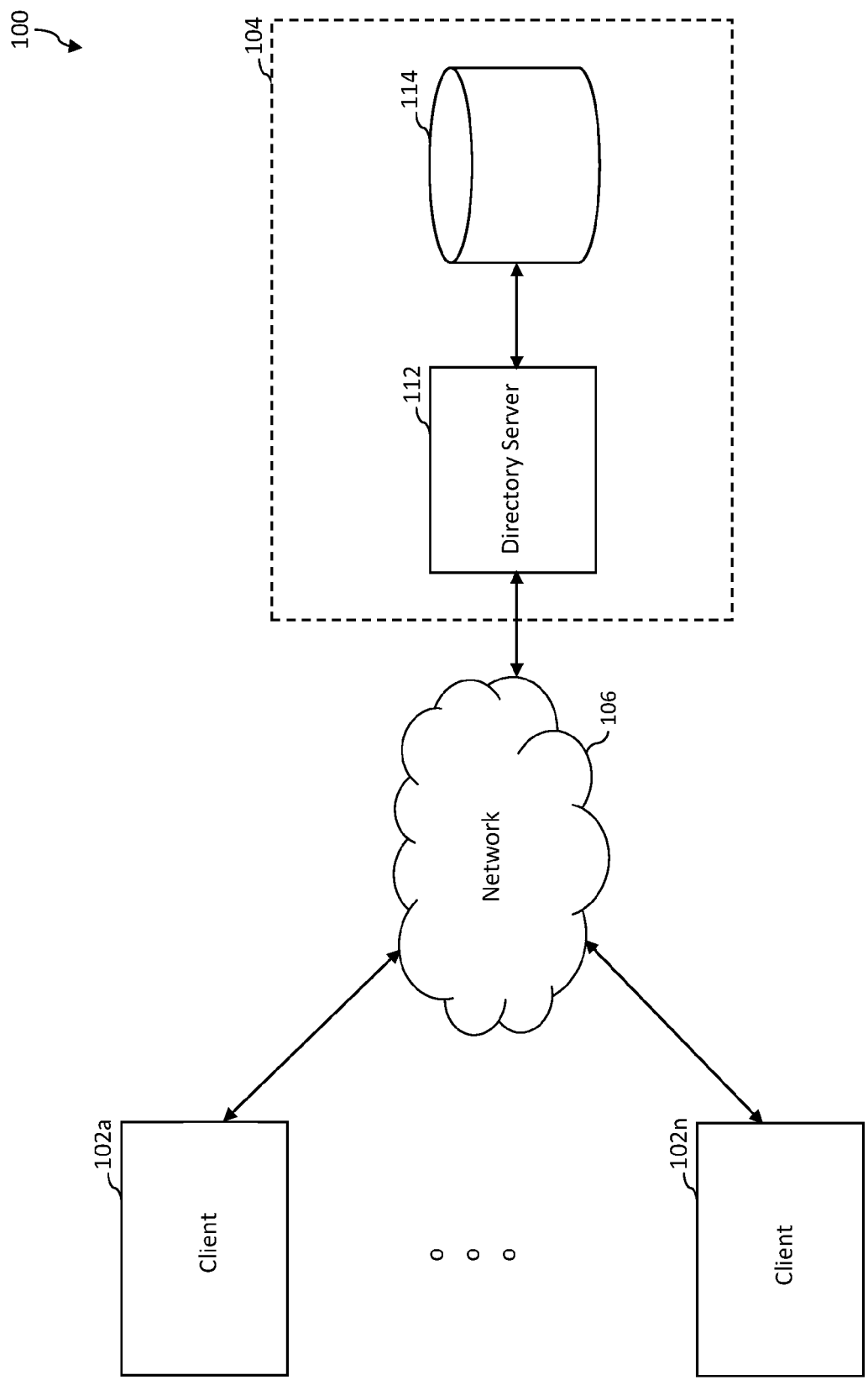
FIG. 1 is a block diagram of an example system in which an embodiment may operate.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example System Implementation

Embodiments provide protocol extensions to the WS-Enumeration protocol. WS-Enumeration typically creates a new "enumeration context" for subsequent traversal/retrieval of result items by means of a "Pull" operation. The initial "Enumerate" operation may also have an associated filter that reduces or otherwise limits the number of result items. However, since WS-Enumeration does not provide an explicit way to specify which fragments of an object, i.e., attributes of an object are returned, a selection protocol extension to the WS-Enumeration protocol is described herein. The selection protocol extension enables retrieval of partial representations of objects, also referred to as "object fragments" or simply "resources," from a directory server. The resources include attributes of the objects that are designated via the selection protocol extension. For instance, if the selection protocol extension designates one attribute of the objects, the partial representation of each object includes that designated attribute.

A sorting protocol extension to the WS-Enumeration protocol is also described herein. The sorting protocols extension enables sorting of objects (or partial representations thereof) to be retrieved from a directory server. The selection and sorting protocol extensions are defined in respective extensible markup language (XML) elements that are distinct from an XML element that defines an object request including a query filter that is provided to the directory server for selection of objects therein. The selection and sorting protocol extensions may be used independently of each other. The computer languages utilized by the XML element that defines the object request and the XML elements corresponding to the selection and sorting protocol extensions need not necessarily be the same. For instance, a different computer language may be used for each.

The sorting protocol extension may enable sorting of objects (or partial representations thereof) based on one or more specified attributes of the objects. The specified attribute(s) may (or may not) be included in attribute(s) of the objects designated in accordance with the selection protocol extension. The objects (or partial representations thereof) may be sorted in ascending or descending order based on the specified attribute(s). The sorting may be performed on a per attribute basis. For instance, the sorting may be performed in ascending order with respect to a first specified attribute and in descending order with respect to a second specified attribute.

FIG. 1 is a block diagram of an example system 100 in which an embodiment may operate. As shown in FIG. 1, system 100 includes a directory service 104 that is accessible to a plurality of clients 102*a*-102*n* via a network 106. As further shown in FIG. 1, directory service 104 includes a directory server 112 and a directory 114.

Directory 114 represents a set of objects that are organized in a logical and hierarchical manner and that are stored on one or more physical storage devices. Objects stored in directory 114 or intended for storage in directory 114 may be referred to herein as directory objects. In one embodiment, directory 114 includes a lightweight directory access protocol (LDAP) directory, which is to say that the objects in directory 114 are represented in accordance with a hierarchical data model that facilitates access to and manipulation of the objects using the well-known LDAP protocol. In accordance with such an embodiment, directory 114 includes a tree of objects, wherein each object consists of a set of attributes. An attribute has a name (an attribute type or attribute description) and one or more values. The attributes are defined in a schema.

Directory server 112 is an entity that is configured to receive request messages from clients 102a-102n via network 106 and to perform operations with respect to data stored in directory 114 responsive to receiving such request messages. Performing an operation with respect to data stored in directory 114 may include, for example, creating, deleting, updating or running queries against objects in directory 114. Directory server 112 is also configured to send one or more response messages to a client 102 via network 106 responsive to receiving certain request messages or request message types. It should be recognized that directory server 112 may be any suitable endpoint that is capable of implementing a Web services protocol.

In an embodiment, each client 102a-102n is configured to generate request messages to directory server 112 that are encoded in accordance with a Web services protocol, and directory server 112 is configured to generate corresponding response messages that are encoded with the same Web services protocol. Such an embodiment is depicted in FIG. 2.

Figure 2:
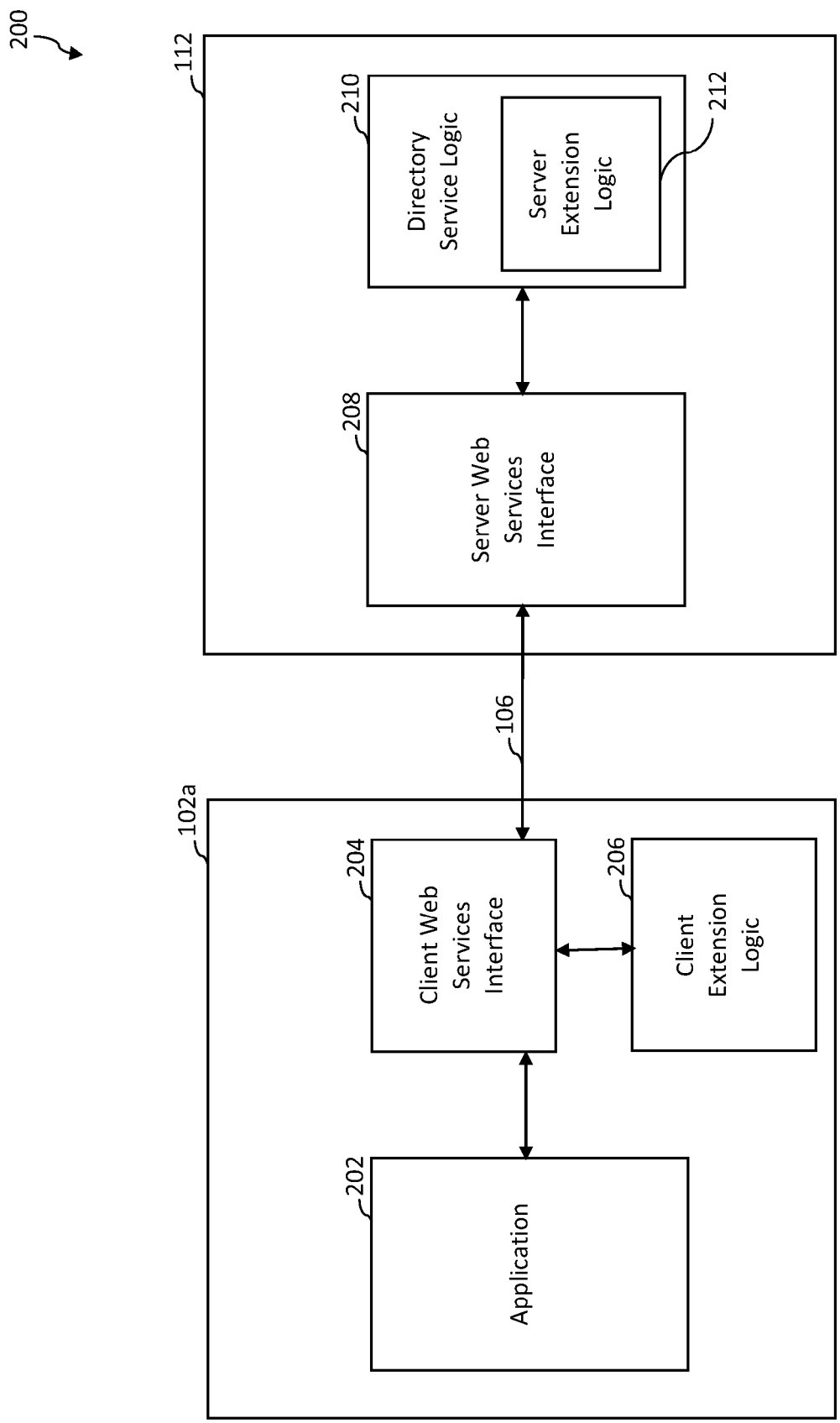
FIG. 2 is a block diagram that provides a more detailed depiction of one of the clients and the directory server represented in FIG. 1.

As shown in FIG. 2, a representative client 102a includes an application 202, a client Web services interface 204, and client extension logic 206. Application 202 is configured to generate object requests for directory server 112. For example, application 202 may generate the object requests using a query filter to select one or more objects stored at directory server 112 based on one or more criteria. Application 202 provides instructions to client extension logic 206 for enabling client extension logic 206 to generate requests (e.g., selection requests and/or sorting requests) that extend the WS-Enumeration protocol.

Client extension logic 206 is configured to generate requests that extend the WS-Enumeration protocol in accordance with instructions provided by application 202. For example, client extension logic 206 may generate a selection request using an XML element for requesting partial representations of objects indicated in an object request generated by application 202 based on instructions provided by application 202. Each partial representation of an object includes one or more specified attributes of that object. In another example, client extension logic 206 may generate a sorting request using an XML element for sorting objects indicated in an object request generated by application 202 or partial representations of the objects specified in a selection request generated by client extension logic 206, based on instructions provided by application 202.

Client Web services interface 204 is configured to encode selection requests and/or sorting requests along with object requests in accordance with a Web service protocol to generate Web services protocol request messages and to transmit such messages to directory server 112 over network 106. Client Web services interface 204 is also configured to receive Web services protocol response messages from directory server 112 via network 106 and to decode such messages to provide directory service responses that may be processed by application 202. Depending upon the implementation, the Web services protocol messages generated and processed by client Web services interface 204 may include messages encoded in accordance with the simple object access protocol (SOAP), as well as messages encoded in accordance with Web services protocols built on SOAP, such as WS-Enumeration.

As further shown in FIG. 2, an implementation of directory server 112 includes a server Web services interface 208 and directory service logic 210. Server Web services interface 208 is configured to receive Web services protocol request messages from client 102a via network 106 and to decode such messages to produce object requests, selection requests, and sorting requests that are suitable for processing by directory service logic 210.

Directory service logic 210 is configured to receive object requests, selection requests, and sorting requests from server Web services interface 208 and, when appropriate, perform certain operations against data in directory 114 in accordance with those requests. Directory service logic 210 includes server extension logic 212 for processing the selection requests and sorting requests. Accordingly, server extension logic 212 enables director server 112 to support the selection and sorting protocol extensions to the WS-Enumeration protocol.

Directory service logic 210 is also configured to generate directory service responses, when appropriate, to certain object requests, selection requests, and/or sorting requests received from server Web services interface 208. Server Web services interface 208 is further configured to encode such directory service responses in accordance with a Web services protocol to generate Web services protocol response messages and to transmit such messages to client 102a over network 106.

In an embodiment, server Web services interface 208 is advantageously configured to decode Web services protocol request messages received from client 102a that are encoded in accordance with a Web services protocol that represents resources using XML. Examples of such Web services protocols include, for example, SOAP-based protocols such as WS-Enumeration. The Web services protocol request messages are decoded to provide object requests, selection requests, and sorting requests that are formatted in accordance with a directory service protocol and are thus suitable for processing by directory service logic 210. In an embodiment, the directory service protocol includes the LDAP protocol, although this is only an example.

In further accordance with such an embodiment, server Web services interface 208 is also advantageously configured to encode directory service response messages received from directory service logic 210 that are formatted in accordance with a directory service protocol, such as LDAP, to produce Web services protocol response messages that are encoded in accordance with a Web services protocol that represents resources using XML, such as WS-Enumeration.

It is noted with respect to the foregoing system that each client 102a-102n as well as directory server 112 may be implemented using a processor-based computer system, although the embodiments are not limited in that regard. One example of a processor-based computer system that may be used to implement aspects of the present invention is described below in Section IV.

Although directory service 104 is shown as including only a single directory server 112 and a single directory 114, it is noted that directory service 104 may include any number of directory servers 112 and directories 114.

Directory server 112 may represent both a processor-based computer system configured to perform the functions of directory server 112 as described herein, as well as one or more computer programs configured to perform such functions when executed upon such a processor-based computer system. In an embodiment in which directory server 112 includes a software-implemented entity, multiple instances of directory server may be implemented on a single physical machine.

Directory 114 may be stored in a single physical memory device or across multiple physical memory devices. Such physical memory device(s) may be integrated within a machine used to implement directory server 112 or externally connected thereto via a network connection or other suitable interface.

Network 106 is intended to represent a packet-switched network and may include one or more wide area networks, local area networks, private networks, public networks, wired networks, wireless networks, or any combination thereof.

III. Further Discussion of WS-Enumeration Protocol

Still referring to FIG. 2, enumeration in accordance with the WS-Enumeration protocol is performed between client 102a and directory server 112 based on five web services description language (WSDL) operations: Enumerate, Pull, Renew, GetStatus, and Release. Each of these operations includes a Web services protocol request message provided by client Web services interface 204 of client 102a to server Web services interface 208 of directory server 112 and a resulting Web services protocol response message provided from server Web services interface 208 of directory server 112 to client Web services interface 204 of client 102a.

During an Enumerate operation, client 102a generates a query filter specifying objects stored in a directory (e.g., directory 114 of FIG. 1) based on one or more criteria. Client 102a provides an Enumerate request message, including an object request that specifies the query filter. The Enumerate request message further includes a selection request and/or a sorting request in accordance with embodiments described herein. For example, the selection and sorting requests may be implemented as XML elements as described below in respective sections III.A. and III.B., though the scope of the embodiments is not limited in this regard. An example Enumerate request message, including a selection request and a sorting request, is described in further detail below in section III.C. for illustrative purposes.

Upon receiving the Enumerate request message, directory server 112 creates an enumeration context mapped to the specified query filter. The query filter is optional, but generally included. The enumeration context represents a logical cursor or identifier through a sequence of resulting data items or resources. Directory server 112 provides an Enumerate response message to client 102a, including the enumeration context, which client 102a is responsible for passing back to directory server 112 during subsequent WS-Enumeration operations.

One or more Pull operations are performed for retrieving object fragments, or resources, identified in the enumeration context. For each Pull operation, client 102a provides a Pull request message to directory server 112 to retrieve one or more of the resources that were requested during the Enumerate operation. Upon receiving a Pull request message, directory server 112 provides the resource(s) indicated in the Pull request. For example, if the Enumerate request message included a selection request, directory server 112 may provide only those attributes designated in the selection request, though it will be recognized that other attribute(s) may be returned in addition to the designated attributes. In another example, if the Enumerate request message included a sorting request, directory server 112 may provide the resources sorted in accordance with the sorting request. An example Pull response message, providing designated attributes of objects sorted in accordance with a sorting request, is described in further detail below in section III.D. for illustrative purposes.

The enumeration context may have a specified expiration time. Client 102a may use the Renew operation to renew the specified expiration time. Client 102a may use the GetStatus operation to obtain the specified expiration time of the enumeration context. Client 102a may use the Release operation to release the enumeration context, indicating an end of the enumeration.

A. Selection Protocol Extension Example

The selection protocol extension to the WS-Enumeration protocol enables retrieval of designated attributes of objects from a directory server during an enumeration. The selection protocol extension may be implemented using a language based on Extensible Markup Language (XML), such as a language derived from the XML Path Language (XPath), though the scope of the embodiments is not limited in this regard. For purposes of illustration, the selection protocol extension may be defined in an XML element having the following XML Schema definition.

```
<xsd:element name = "Selection" xmlns:xsd=
"http://www.w3.org/2001/XMLSchema" >
    <xsd:complexType>
        <xsd:sequence>
            <xsd:element name="SelectionProperty" type="xsd:string"
                minOccurs="1" maxOccurs="unbounded"/>
        </xsd:sequence>
        <xsd:attribute name="Dialect" type="xsd:anyURI" />
    </xsd:complexType>
</xsd:element>
```

This schema definition defines the structure and content of the selection protocol extension XML element at a relatively high level of abstraction. The XML schema definition indicates that an XML element named "Selection" contains a sequence of one or more elements named "SelectionProperty" and an attribute named "Dialect." Each SelectionProperty element indicates a designated attribute of directory objects that is to be retrieved during the enumeration. The Dialect attribute indicates the language to be used for specifying the attribute(s) designated in the respective SelectionProperty element(s).

The contents of the selection protocol extension XML element may be described in accordance with the following example format:

```
<ad:Selection
Dialect="http://schemas.microsoft.com/2008/1/ActiveDirectory/Dialect/
XpathQuery" />
    <ad:SelectionProperty>
        list-attribute-here
    </ad:SelectionProperty>
    ...
</ad:Selection>
```

The element named "ad:Selection" references a dialect, which indicates the language to be used for specifying the attribute(s) designated in the respective SelectionProperty element(s). In this example, the dialect is identified by the URI "http://schemas.microsoft.com/2008/1/ActiveDirectory/Dialect/XpathQuery", though this is only one example, and it will be recognized that other dialects can be used. The Selection element includes one or more elements named "ad: SelectionProperty" corresponding to a respective attributes. Each element begins with the XML namespace prefix "ad:" in this example, though it will be recognized that this prefix and other prefixes described herein are arbitrary. For instance, the protocol extensions described herein are defined by respective uniform resource indicators (URIs), each of which defines a namespace. XML maps prefixes to namespaces as a short-hand convention. The prefixes may be any suitable sequence of one or more characters. A client may specify a mapping between prefixes and namespaces to inform a directory server how to interpret requests provided by the client. The client may use logic that is configured to interpret requests in that namespace.

The contents of the Dialect attribute in this example, http:// schemas.microsoft.com/2008/1/ActiveDirectory/Dialect/ XPathQuery, indicate that the language to be used for specifying the attribute(s) designated in the respective SelectionProperty element(s) is the same as the language that is used for XPath queries. Persons skilled in the relevant art(s) will recognize that the language used for specifying the attribute(s) designated in the respective SelectionProperty element(s) may be different from the language that is used for XPath queries.

B. Sorting Protocol Extension Example

A sorting protocol extension to the WS-Enumeration protocol enables sorting of objects (or partial representations thereof) to be retrieved from a directory server during an enumeration. The sorting protocol extension may be implemented using a language based on Extensible Markup Language (XML), such as a language derived from the XML Path Language (XPath), though the scope of the embodiments is not limited in this regard. For purposes of illustration, the sorting protocol extension may be defined in an XML element having the following XML Schema definition.

```
<xsd:element name = "Sorting" xmlns:xsd=
"http://www.w3.org/2001/XMLSchema">
    <xsd:complexType>
        <xsd:sequence>
            <xsd:element name="SortingProperty" type="xsd:string"
                minOccurs="1" maxOccurs="1"/>
            <xsd:complexType>
                <xsd:simpleContent>
                    <xsd:extension base="xsd:string">
                        <xsd:attribute name="Ascending" use="optional"
                            type="xsd:boolean"/>
                    </xsd:extension>
                </xsd:simpleContent>
            </xsd:complexType>
        </xsd:element>
        </xsd:sequence>
        <xsd:attribute name="Dialect" type="xsd:anyURI" />
    </xsd:complexType>
</xsd:element>
```

This schema definition defines the structure and content of the sorting protocol extension XML element. The XML schema definition indicates that an XML element named "Sorting" contains a sequence of one element named "SortingProperty." The contents of the SortingProperty element contain an expression written in the language specified by the dialect to identify an attribute upon which the sorting is to be based.

The Sorting element contains a sequence of one SortingProperty element for illustrative purposes and is not intended to be limiting. For example, the Sorting element may include a sequence of multiple SortingProperty elements, such that the sorting functionality associated with the sorting protocol extension is performed in the order defined by the list of the SortingProperty elements. In accordance with this example, if the Sorting element includes first, second, and third SortingProperty elements in that order, sorting may be performed with respect to a first attribute corresponding to the first SortingProperty element. Results having the same value for the first attribute may then be sorted with respect to a second attribute corresponding to the second SortingProperty element. Results having the same value for the first attribute and the same value for the second attribute may then be sorted with respect to a third attribute corresponding to the third SortingProperty element. Sorting may be performed with respect to any number of SortingProperty elements defined by schema definition.

The SortingProperty element contains an attribute named "Ascending," which is represented as a Boolean predicate indicating whether resources are to be sorted in an ascending order or a descending order with respect to the attribute specified by the SortingProperty element. For instance, an Ascending attribute value of "True" may indicate that resources are to be sorted in an ascending order based on the specified attribute. An Ascending attribute value of "False" may indicate that the resources are to be sorted in a descending order based on the specified attribute. The Ascending attribute is provided for illustrative purposes and is not intended to be limiting. Persons skilled in the relevant art(s) will recognize that any suitable attribute may be used. In an embodiment, a default attribute value may be used when an attribute value is not specified.

The Sorting element further contains an attribute named "Dialect.," which indicates the computer language used in the expression(s) that are the contents of the SortingProperty element(s) (i.e., the expression(s) that name the attribute(s) on which the results are to be sorted). The contents of the sorting protocol extension XML element may be described in accordance with the following example format:

```
<ad:Sorting
Dialect="http://schemas.microsoft.com/2008/1/ActiveDirectory/Dialect/
XpathQuery" />
    <ad:SortingProperty     Ascending=(true|false)>
        list-attribute-here
    </ad:SortingProperty>
    . . .
</ad:Sorting>
```

The element named "ad:Sorting" references a dialect, which indicates the language to be used for sorting the resources in accordance with the Sorting element. In this example, the dialect is identified by the URI "http://schemas-.microsoft.com/2008/1/ActiveDirectory/Dialect/ XpathQuery", though this is only one example, and it will be recognized that other dialects can be used. The Sorting element includes one or more elements named "ad:SortingProperty" corresponding to respective one or more attributes. Each element begins with the XML namespace prefix "ad:" in this example, though it will be recognized that this prefix and other prefixes described herein are arbitrary. For instance, the protocol extensions described herein are defined by respective uniform resource indicators (URIs), each of which defines a namespace. XML maps prefixes to namespaces as a short-hand convention. The prefixes may be any suitable sequence of one or more characters. A client may specify a mapping between prefixes and namespaces to inform a directory server how to interpret requests provided by the client. The client may use logic that is configured to interpret requests in that namespace.

Each SortingProperty element specifies whether the resources are to be sorted in an ascending order or in a descending order with respect to the attribute corresponding to the SortingProperty element. It should be noted that an attribute corresponding to a SortingProperty element of the sorting protocol extension XML element need not necessarily be specified with respect to a SelectionProperty element of the selection protocol extension XML element, and vice versa. For instance, it is not necessary for attribute(s) listed in the selection protocol extension XML element to overlap with attribute(s) listed in the sorting protocol extension XML element.

The contents of the Dialect attribute in this example, http://schemas.microsoft.com/2008/1/ActiveDirectory/Dialect/XPathQuery, indicates that the language to be used for sorting the resources is the same as the language that is used for XPath queries. Persons skilled in the relevant art(s) will recognize that the language used for sorting the resources may be different from the language that is used for XPath queries.

C. Example Enumerate Request Message

The following example illustrates an Enumerate request message, which includes an object request, a selection request, and a sorting request for illustrative purposes.

```
<soapenv:Envelope
    xmlns:soapenv="http://www.w3.org/2003/05/soap-envelope"
    xmlns:wsa="http://www.w3.org/2005/08/addressing">
    <soapenv:Header>
        <wsa:Action soapenv:mustUnderstand="1">
            http://schemas.xmlsoap.org/ws/2004/09/enumeration/Enumerate
        </wsa:Action>
        <instance xmlns="http://schemas.microsoft.com/2008/1/ActiveDirectory">
            ldap:389
        </instance>
        <wsa:MessageID>
            urn:uuid:e36457ff-d0f1-4c85-abe6-6cdf4bd511e9
        </wsa:MessageID>
        <wsa:ReplyTo>
            <wsa:Address>
                http://www.w3.org/2005/08/addressing/anonymous
            </wsa:Address>
        </wsa:ReplyTo>
        <wsa:To
soapenv:mustUnderstand="1">net.tcp://server01.fabrikam.com:9389/ActiveDirectory
WebServices/Windows/Enumeration</wsa:To>
    </soapenv:Header>
    <soapenv:Body>
        <wsen:Enumerate
            xmlns:wsen="http://schemas.xmlsoap.org/ws/2004/09/enumeration"
            xmlns:adlq="http://schemas.microsoft.com/2008/1/ActiveDirectory/Dialect/
            LdapQuery"
            xmlns:addata="http://schemas.microsoft.com/2008/1/ActiveDirectory/
            Data"
            xmlns:ad="http://schemas.microsoft.com/2008/1/ActiveDirectory"
            xmlns:xsi="http://www.w3.org/2001/XMLSchema-instance"
            xmlns:xsd="http://www.w3.org/2001/XMLSchema">
            <wsen:Filter
Dialect="http://schemas.microsoft.com/2008/1/ActiveDirectory/Dialect/LdapQuery">
                <adlq:LdapQuery>
                    <adlq:Filter>(objectclass=user)</adlq:Filter>
                    <adlq:BaseObject>cc36a2a7-79a2-4d96-b1c2-
                    31c30493b801</adlq:BaseObject>
                    <adlq:Scope>subtree</adlq:Scope>
                </adlq:LdapQuery>
            </wsen:Filter>
            <ad:Selection
Dialect="http://schemas.microsoft.com/2008/1/ActiveDirectory/Dialect/XPath-Level-
1">
                <ad:SelectionProperty>
                    ad:container-hierarchy-parent
                </ad:SelectionProperty>
                <ad:SelectionProperty>
                    addata:relativeDistinguishedName
                </ad:SelectionProperty>
                <ad:SelectionProperty>
                    addata:givenName
                </ad:SelectionProperty>
            </ad:Selection>
            <ad:Sorting
Dialect="http://schemas.microsoft.com/2008/1/ActiveDirectory/Dialect/XPath-Level-1">
                <ad:SortingProperty Ascending="true">
                    addata:givenName
                </ad:SortingProperty>
```

```
    </ad:Sorting>
  </wsen:Enumerate>
 </soapenv:Body>
</soapenv:Envelope>
```

The example Enumerate request message includes a SOAP message, which is embodied in a SOAP envelope XML element named "soapenv:Envelope." The SOAP envelope XML element includes both a SOAP header XML element named "soapenv:Header" and a SOAP body XML element named "soapenv:Body." The SOAP header XML element includes XML elements respectively named "wsa:Action," "instance," "wsa:MessageID," and "wsa:ReplyTo".

The content of the XML element named "wsa:Action" ("http://schemas.xmlsoap.org/ws/2004/09/enumeration/Enumerate") specifies that the operation to be performed is a WS-Enumeration Enumerate operation. The XML element named "instance" is implementation-specific and is not intended to be limiting. The XML element named "wsa:MessageID" provides a unique identifier (e.g., a string of numbers, letters, other characters, or any combination thereof) generated by the client to uniquely identify the Enumerate request message. For instance, the directory server to which the Enumerate request message is directed may include the unique identifier in a response to the client for enabling the client to match the response to the request. The XML element named "wsa:To" indicates a uniform reference identifier (URI) of the directory server to which the Enumerate request message is directed. The XML element named "wsa:ReplyTo" indicates to the directory server where to send a response to the Enumerate request message.

The SOAP body XML element includes an XML element named "wsen:Enumerate," which includes namespace prefix mappings denoted by the prefix "xmlns." The namespace definitions map the short-hand prefixes of "wsen", "addata," "ad," "xsi," and "xsd" to respective namespaces to enable a directory server to which the Enumerate request message is directed to interpret elements having the short-hand prefixes in terms of the rules of the respective namespaces. The short-hand prefixes and namespaces provided in this example Enumerate request message are provided for illustrative purposes and are not intended to be limiting. It should be noted that a SOAP request may be configured to reference any number of namespaces.

The SOAP body XML element further includes an object request, a selection request, and a sorting request. The object request is defined by an XML element named "wsen:Filter", which is an XML-based query filter for selecting objects stored in the directory server to which the Enumerate request message is directed. The object request contains a Boolean predicate in a dialect specified by the URI, http://schemas.microsoft.com/2008/1/ActiveDirectory/Dialect/LdapQuery. This dialect is provided for illustrative purposes and is not intended to be limiting. It will be recognized that other dialects can be used. The object request is configured to select objects having an object class of "user" for illustrative purposes, though persons skilled in the relevant art(s) will recognize that the object request may be configured to specify any suitable one or more criteria for selecting objects.

The selection request in this example Enumerate request message is defined by an XML element named "ad:Selection," which references a dialect specified by the URI, http://schemas.microsoft.com/2008/1/ActiveDirectory/Dialect/XPath-Level-1. This dialect is provided for illustrative purposes and is not intended to be limiting. It will be recognized that other dialects can be used. The expressions "ad:container-hierarchy-parent," "addata:relativeDistinguishedName," and "addata:givenName," are written in the specified dialect. These expressions, in turn, identify attributes. In this example, the expressions indicate the names of the respective attributes, though other dialects may have different mapping. The attributes listed in the selection request are designated to be provided by the directory server in response to the directory server receiving the Enumerate request message. For instance, the directory server may include the designated attributes in a Pull response message, an example of which is described in further detail below in section III.D.

The sorting request is defined by an XML element named "ad:Sorting," which references the same dialect referenced by the selection request for illustrative purposes, though the scope of the embodiments is not limited in this regard. For instance, the selection request and the sorting request may reference different dialects. The sorting request indicates that resources received in response to the Enumerate request message are to be sorted based on the attribute identified by the expression "addata:givenName," which is written in the dialect indicated by the Dialect attribute. Although the attribute to be used for sorting is included in the attributes designated in the selection request, the scope of the embodiments is not limited in this regard. For instance, the attribute to be used for sorting may not be included in the attribute(s) designated in the selection request. The sorting request specifies an order for the resources that are to be provided by the directory server in response to receiving the Enumerate request message. For instance, the directory server may sort the resources in a Pull response message that includes the resources, as described in further detail below in section III.D.

D. Example Pull Response Message

When the directory server responds to the Enumerate request message with an Enumerate response message, the client provides a Pull request message to the directory server to retrieve the resources that were designated in the Enumerate request message. The directory server provides a Pull response message in response to the Pull request message, providing the designated resources. Following is an example Pull response message that may be used to provide the attributes designated in the Enumerate request message described in section III.C. above.

```
<soapenv:Envelope
    xmlns:soapenv="http://www.w3.org/2003/05/soap-envelope"
    xmlns:wsa="http://www.w3.org/2005/08/addressing">
  <soapenv:Header>
    <wsa:Action soapenv:mustUnderstand="1">
      http://schemas.xmlsoap.org/ws/2004/09/enumeration/PullResponse
    </wsa:Action>
    <wsa:RelatesTo>urn:uuid:b22747a9-ca15-41de-8c91-
      5a51bd88669c</wsa:RelatesTo>
    <wsa:To soapenv:mustUnderstand="1">
      http://www.w3.org/2005/08/addressing/anonymous
    </wsa:To>
  </soapenv:Header>
  <soapenv:Body>
```

-continued

```
<wsen:PullResponse
    xmlns:wsen="http://schemas.xmlsoap.org/ws/2004/09/
        enumeration"
    xmlns:xsi="http://www.w3.org/2001/XMLSchema-instance"
    xmlns:xsd="http://www.w3.org/2001/XMLSchema"
    xmlns:ad="http://schemas.microsoft.com/2008/1/
        ActiveDirectory"
    xmlns:addata="http://schemas.microsoft.com/2008/1/
        ActiveDirectory/Data">
    <wsen:EnumerationContext>
        cda3e08b-cec1-42bb-8245-7cb6235a24b8
    </wsen:EnumerationContext>
    <wsen:Items>
        <addata:user>
            <ad:objectReferenceProperty>
                <ad:value xsi:type="xsd:string">
                    373e1409-cf88-41dc-b8ea-bdd27d54e073
                </ad:value>
            </ad:objectReferenceProperty>
            <ad:container-hierarchy-parent>
                <ad:value xsi:type="xsd:string">
                    41816238-95ca-48d9-9a99-3bd9ae9e0e42
                </ad:value>
            </ad:container-hierarchy-parent>
            <ad:relativeDistinguishedName>
                <ad:value
                    xsi:type="xsd:string">CN=TestUser1</ad:value>
            </ad:relativeDistinguishedName>
            <addata:givenName LdapSyntax="UnicodeString">
                <ad:value xsi:type="xsd:string">John</ad:value>
            </addata:givenName>
        </addata:user>
        <addata:user>
            <ad:objectReferenceProperty>
                <ad:value xsi:type="xsd:string">
                    51d67624-d52d-421d-a0d6-1dc350abd009
                </ad:value>
            </ad:objectReferenceProperty>
            <ad:container-hierarchy-parent>
                <ad:value xsi:type="xsd:string">
                    41816238-95ca-48d9-9a99-3bd9ae9e0e42
                </ad:value>
            </ad:container-hierarchy-parent>
            <ad:relativeDistinguishedName>
                <ad:value xsi:type="xsd:string">CN=TestUser2</ad:value>
            </ad:relativeDistinguishedName>
            <addata:givenName LdapSyntax="UnicodeString">
                <ad:value xsi:type="xsd:string">Robert</ad:value>
            </addata:givenName>
        </addata:user>
    </wsen:Items>
</wsen:PullResponse>
</soapenv:Body>
</soapenv:Envelope>
```

The example Pull response message includes a SOAP message, which is embodied in a SOAP envelope XML element named "soapenv:Envelope." The SOAP envelope XML element includes both a SOAP header XML element named "soapenv:Header" and a SOAP body XML element named "soapenv:Body." The SOAP body XML element includes an XML element named "wsen:Items," which includes the resources that were designated in the Enumerate protocol message. In particular the wsen:Item element includes two XML elements named "addata:user," each corresponding to a respective object stored in the directory server. Each addata: user element includes XML elements named "ad:objectReferenceProperty," "ad:container-hierarchy-parent," "ad:relativeDistinguishedName," and "addata:givenName," each of which corresponds to a respective attribute. The attributes corresponding to the XML elements named "ad:container-hierarchy-parent," "ad:relativeDistinguishedName," and "addata:givenName" were designated in the Enumerate request message described above in section III.C., but the attribute corresponding to the XML element named "ad:objectReferenceProperty" was not designated therein. The ad:objectReferenceProperty element is included in each of the addata:user elements to illustrate that the rules of the selection and sorting protocol extensions allow the directory server to provide additional attributes in the Pull response message beyond those designated in the Enumerate request message.

It should be noted that the XML elements named "addata: user," which represent partial representations of the directory objects, are sorted in this example Pull response message in accordance with the order specified in the sorting request of the Enumerate request message.

IV. Further Embodiments Regarding Selection and Sorting Protocol Extensions

Figure 3:
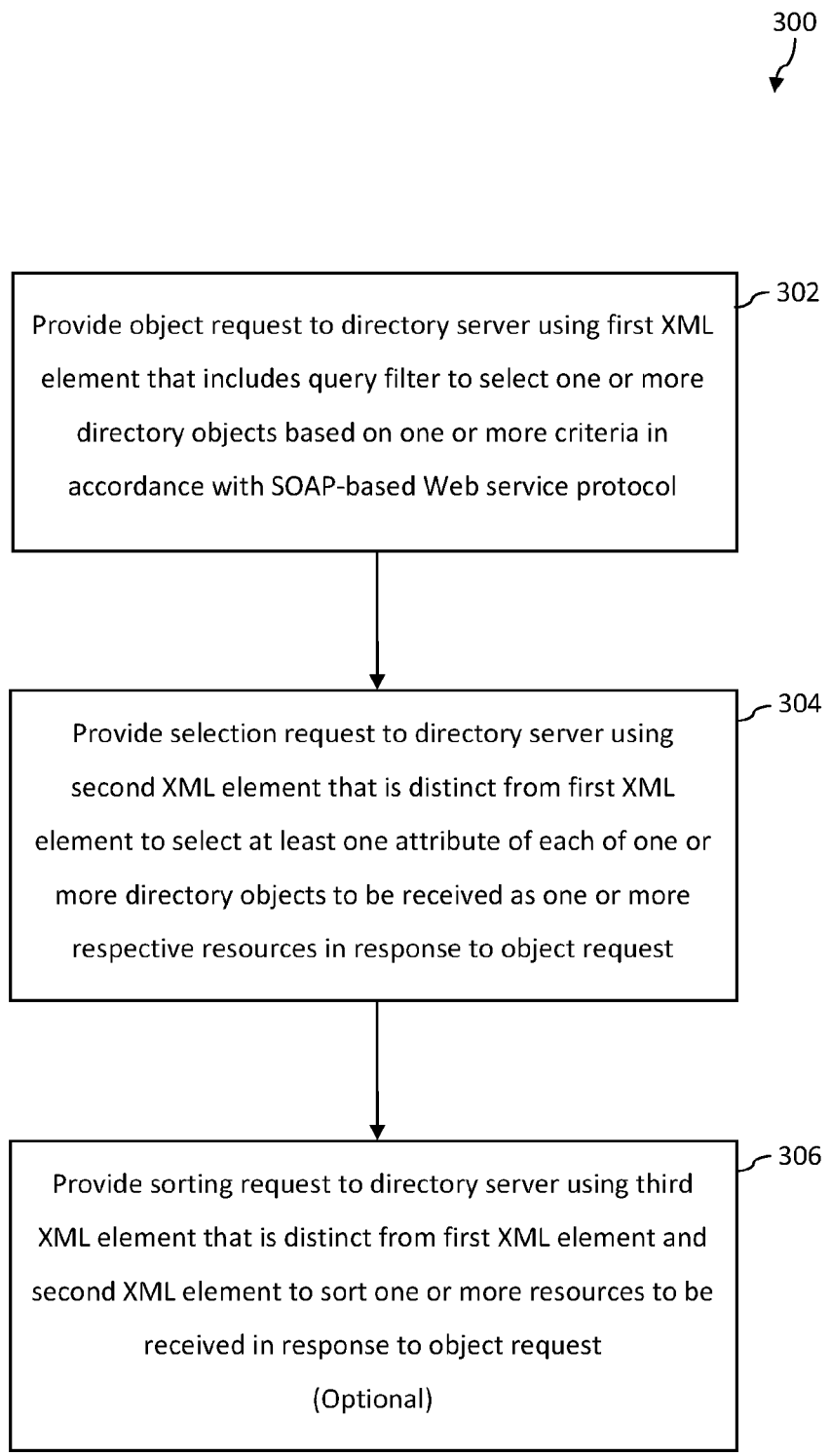
FIG. 3 depicts a flowchart of a method for requesting resources (e.g., objects or attributes thereof) from a directory server in accordance with an embodiment.
Figure 4:
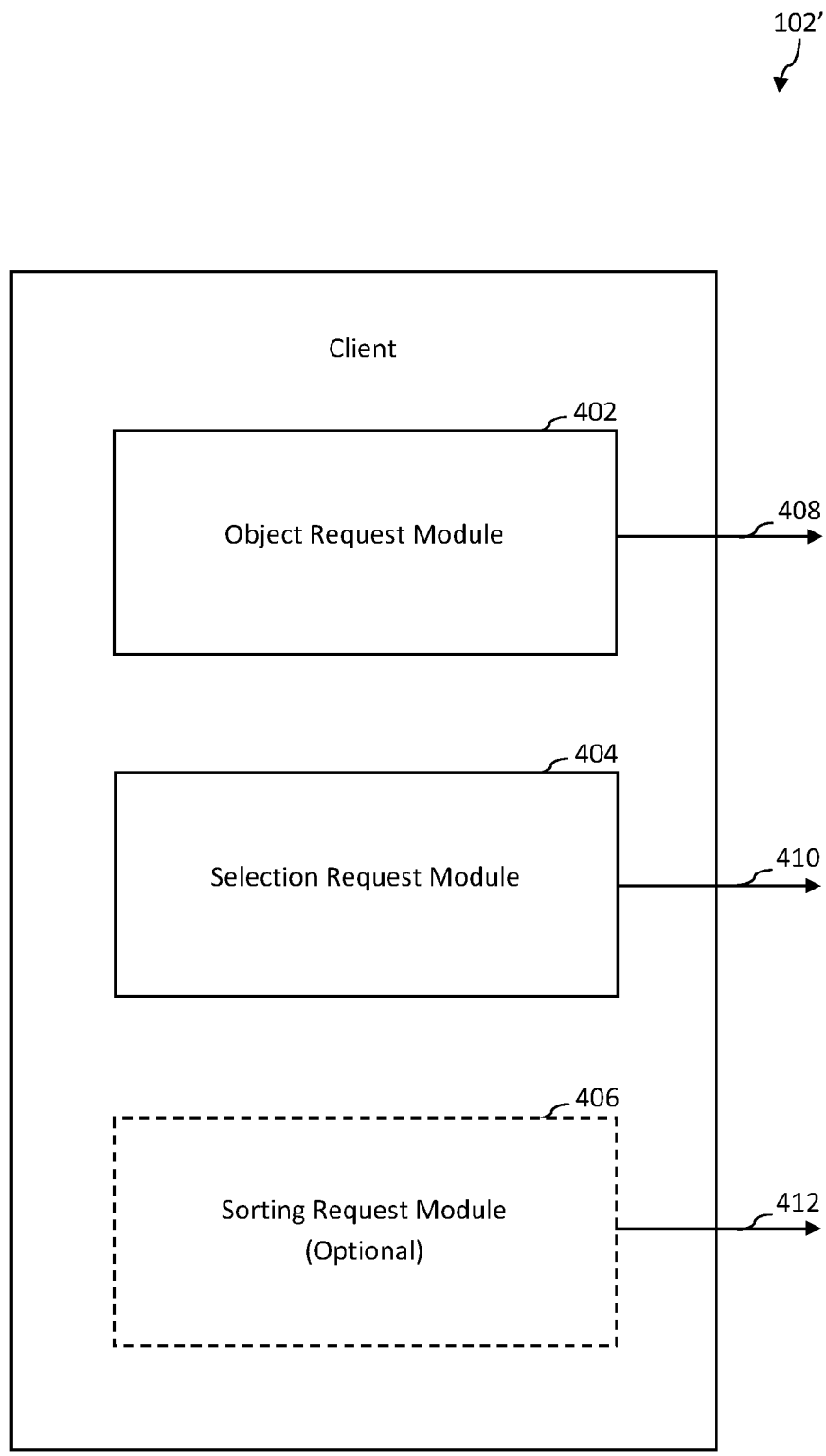
FIG. 4 is a block diagram of an example implementation of a client shown in FIG. 1 in accordance with an embodiment.

FIG. 3 depicts a flowchart 300 of a method for requesting resources represented using XML from a directory server in accordance with a SOAP-based Web service protocol in accordance with an embodiment. Flowchart 300 may be performed by a client 102 of system 100 shown in FIG. 1, for example. For illustrative purposes, flowchart 300 is described with respect to a client 102' shown in FIG. 4, which is an example of client 102, according to an embodiment. As shown in FIG. 4, client 102' includes an object request module 402, a selection request module 404, and an optional sorting request module 406. Further structural and operational embodiments will be apparent to persons skilled in the relevant art(s) based on the discussion regarding flowchart 300. Flowchart 300 is described as follows.

As shown in FIG. 3, the method of flowchart 300 begins at step 302. In step 302, an object request is provided to a directory server using a first XML element that includes a query filter to select one or more directory objects based on one or more criteria in accordance with a SOAP-based Web service protocol. In an example implementation, object request module 402 of client 102' may provide an object request 408 to the directory server using the first XML element.

At step 304, a selection request is provided to the directory server using a second XML element that is distinct from the first XML element to select at least one attribute of each of the one or more directory objects to be received as one or more respective resources in response to the object request. In an example implementation, selection request module 404 may provide a selection request 410 to the directory server using the second XML element.

At optional step 306, a sorting request may be provided to the directory server using a third XML element that is distinct from the first XML element and the second XML element to sort the one or more resources to be received in response to the object request. In an example implementation, sorting request module 406 may provide a sorting request 412 to the directory server using the third XML element. The third XML element may be configured to sort the one or more resources in any suitable manner. For instance, the third XML element may be configured to sort the one or more resources in an ascending order, a descending order, etc. with respect to any one or more attributes associated with the one or more resources (or object(s) from which the resource(s) are derived). The attribute(s) upon which the sorting is to be performed may be included (or not included) in the resources to be received in accordance with the selection request.

It will be recognized that client 102' may incorporate any one or more of the object request 408, the selection request 410, and/or the sorting request 412 into an Enumerate request message before client 102' transmits the requests 408, 410, 412 to the directory server. The first, second, and third XML elements corresponding to the respective object request 408, selection request 410, and sorting request 412 may be implemented using any suitable respective computer languages. Moreover, referring to the XML elements as "first, second, and third" is not intended to limit the order in which the XML elements are implemented. For instance, it will be recognized that the first, second, and third XML elements may be implemented in any order.

Figure 5:
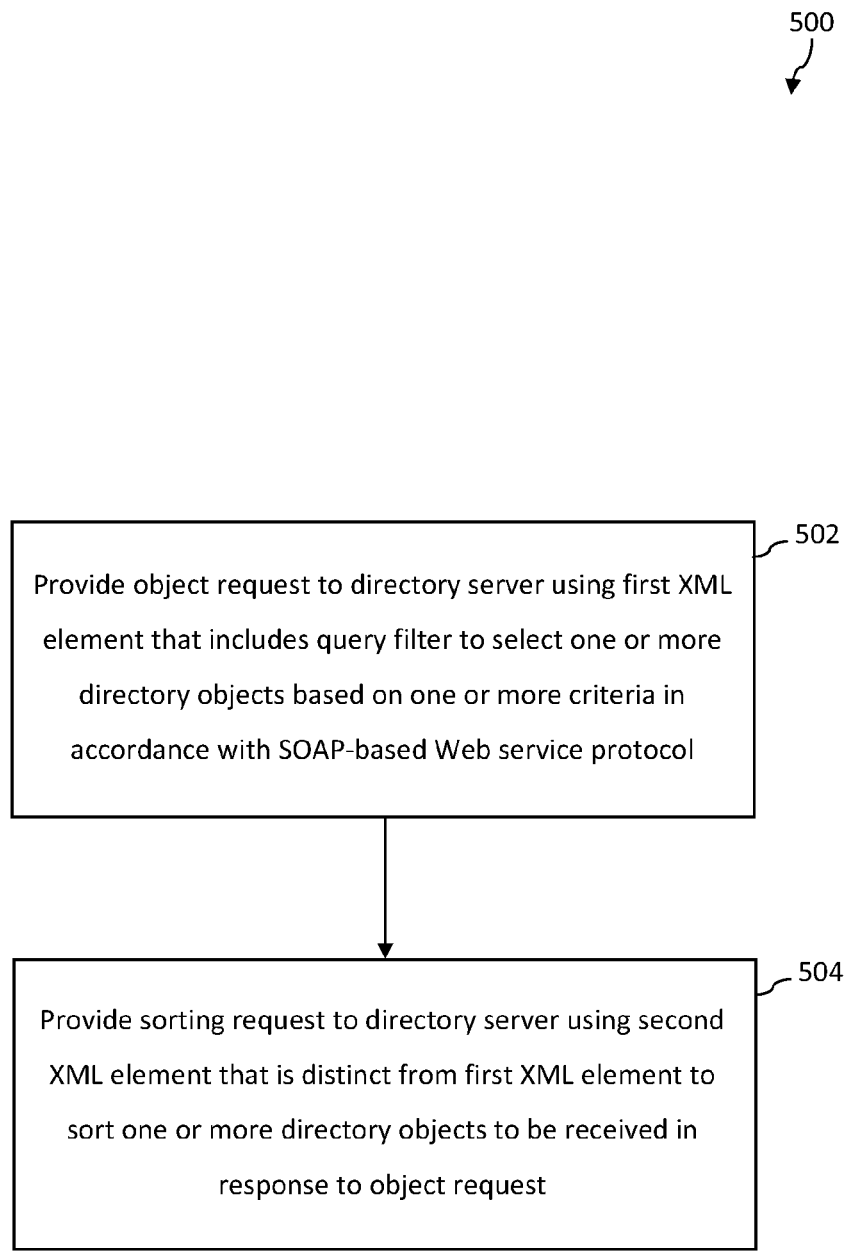
FIG. 5 depicts a flowchart of a method for requesting objects from a directory server in accordance with an embodiment.
Figure 6:
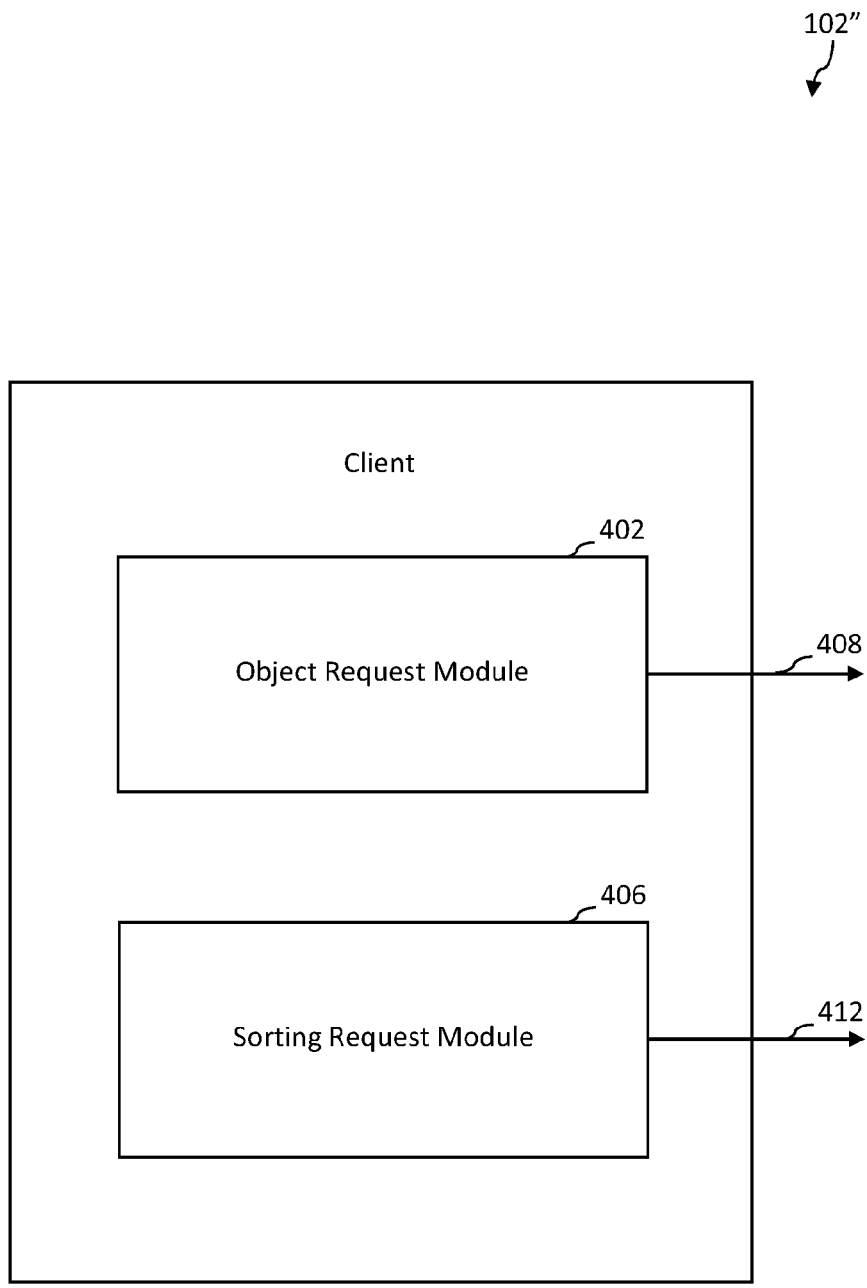
FIG. 6 is a block diagram of another example implementation of a client shown in FIG. 1 in accordance with an embodiment.

FIG. 5 depicts a flowchart 500 of a method for requesting objects represented using XML from a directory server in accordance with a SOAP-based Web service protocol in accordance with an embodiment. Flowchart 500 may be performed by a client 102 of system 100 shown in FIG. 1, for example. For illustrative purposes, flowchart 500 is described with respect to a client 102" shown in FIG. 6, which is another example of client 102, according to an embodiment. As shown in FIG. 6, client 102" includes an object request module 402 and a sorting request module 406. Further structural and operational embodiments will be apparent to persons skilled in the relevant art(s) based on the discussion regarding flowchart 500. Flowchart 500 is described as follows.

As shown in FIG. 5, the method of flowchart 500 begins at step 502. In step 502, an object request is provided to a directory server using a first XML element that includes a query filter to select one or more directory objects based on one or more criteria in accordance with a SOAP-based Web service protocol. In an example implementation, object request module 402 may provide an object request 408 to the directory server using the first XML element.

At step 504, a sorting request is provided to the directory server using a second XML element that is distinct from the first XML element to sort the one or more directory objects to be received in response to the object request. In an example implementation, sorting request module 406 may provide a sorting request 412 to the directory server using the second XML element.

Figure 7:
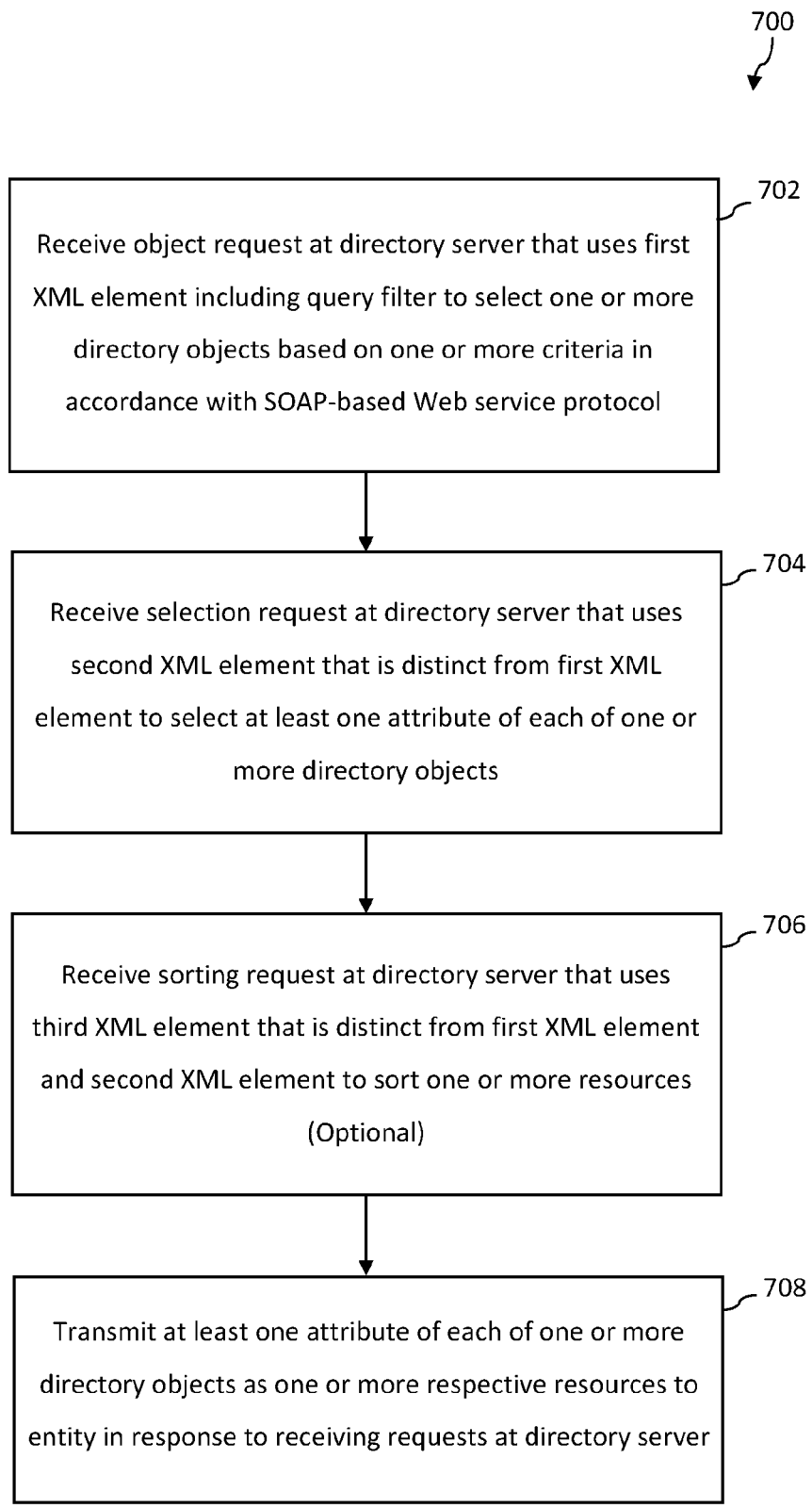
FIG. 7 depicts a flowchart of a method for providing resources from a directory server in accordance with an embodiment.
Figure 8:
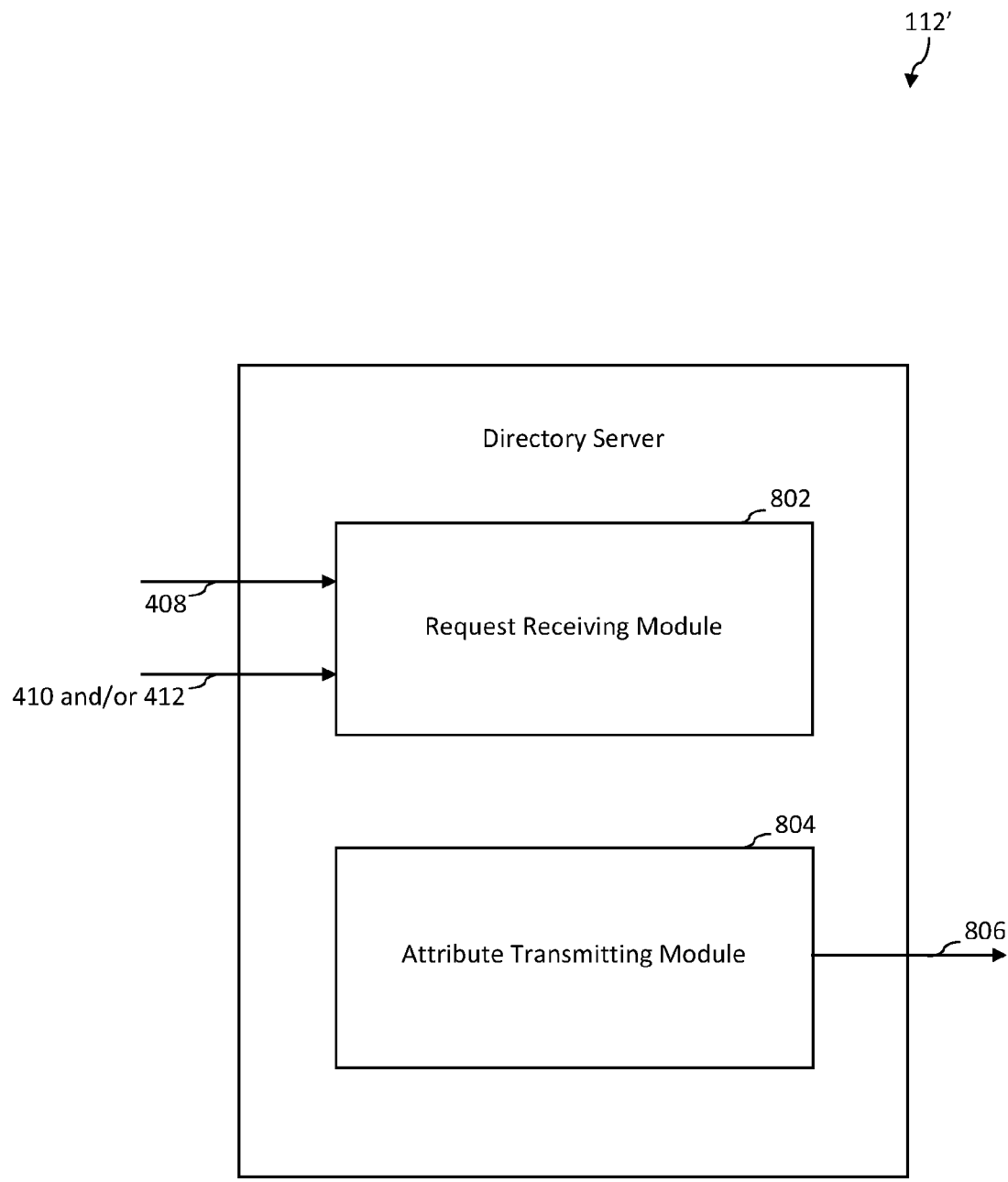
FIG. 8 is a block diagram of an example implementation of a directory server shown in FIG. 1 in accordance with an embodiment.

FIG. 7 depicts a flowchart 700 of a method for providing resources represented using XML from a directory server in accordance with a SOAP-based Web service protocol in accordance with an embodiment. Flowchart 700 may be performed by a directory server 112 of system 100 shown in FIG. 1, for example. For illustrative purposes, flowchart 700 is described with respect to a directory server 112' shown in FIG. 8, which is an example of directory server 112, according to an embodiment. As shown in FIG. 8, directory server 112' includes a request receiving module 802 and an attribute transmitting module 804. Further structural and operational embodiments will be apparent to persons skilled in the relevant art(s) based on the discussion regarding flowchart 700. Flowchart 700 is described as follows.

As shown in FIG. 7, the method of flowchart 700 begins at step 702. In step 702, an object request is received at the directory server. The object request uses a first XML element including a query filter to select one or more directory objects based on one or more criteria in accordance with a SOAP-based Web service protocol. In an example implementation, request receiving module 802 of directory server 112' may receive an object request 408.

At step 704, a selection request is received at the directory server. The selection request uses a second XML element that is distinct from the first XML element to select at least one attribute of each of the one or more directory objects. In an example implementation, receiving module 802 may receive a selection request 410.

At optional step 706, a sorting request is received at the directory server. The sorting request uses a third XML element that is distinct from the first XML element and the second XML element to sort the one or more resources. In an example implementation, receiving module 802 may receive a sorting request 412.

At step 708, the at least one attribute of each of the one or more directory objects is transmitted as one or more respective resources to an entity in response to receiving the requests at the directory server. For instance, if optional step 706 is not performed, the at least one attribute of each of the one or more directory objects may be transmitted as one or more respective resources to the entity in response to receiving the object request and the selection request. If optional step 706 is performed, the at least one attribute of each of the one or more directory objects may be transmitted as one or more respective resources to the entity in accordance with the sorting request. In an example implementation, attribute transmitting module 804 may transmit at least one attribute 806 of each of the one or more directory objects to the entity. The entity may be a client 102 shown in FIG. 1, for example. It should be noted that the one or more directory objects may not include any of the attributes requested in the selection request, in which case an empty resource may be provided to the entity.

Figure 9:
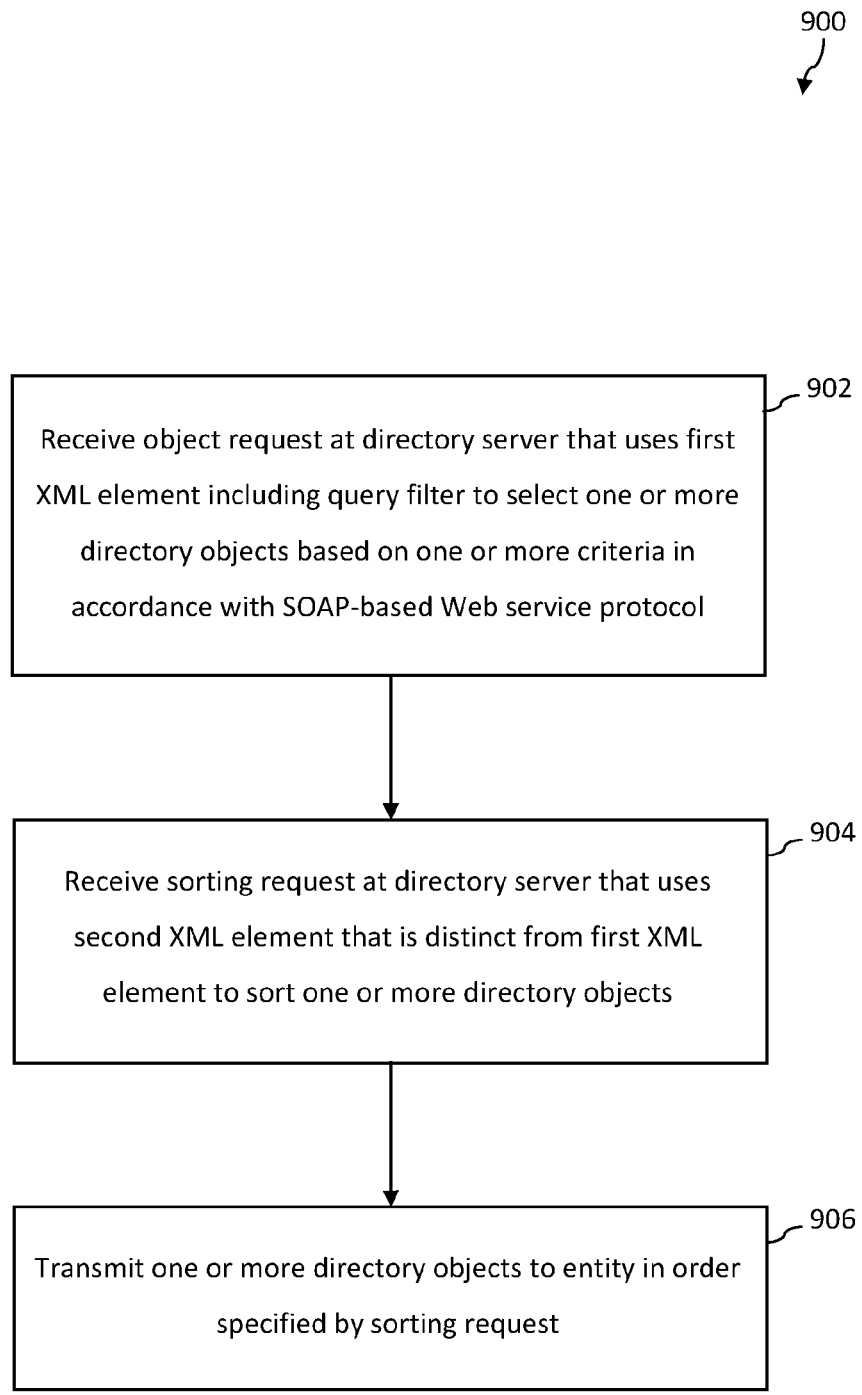
FIG. 9 depicts a flowchart of a method for providing objects from a directory server in accordance with an embodiment.
Figure 10:
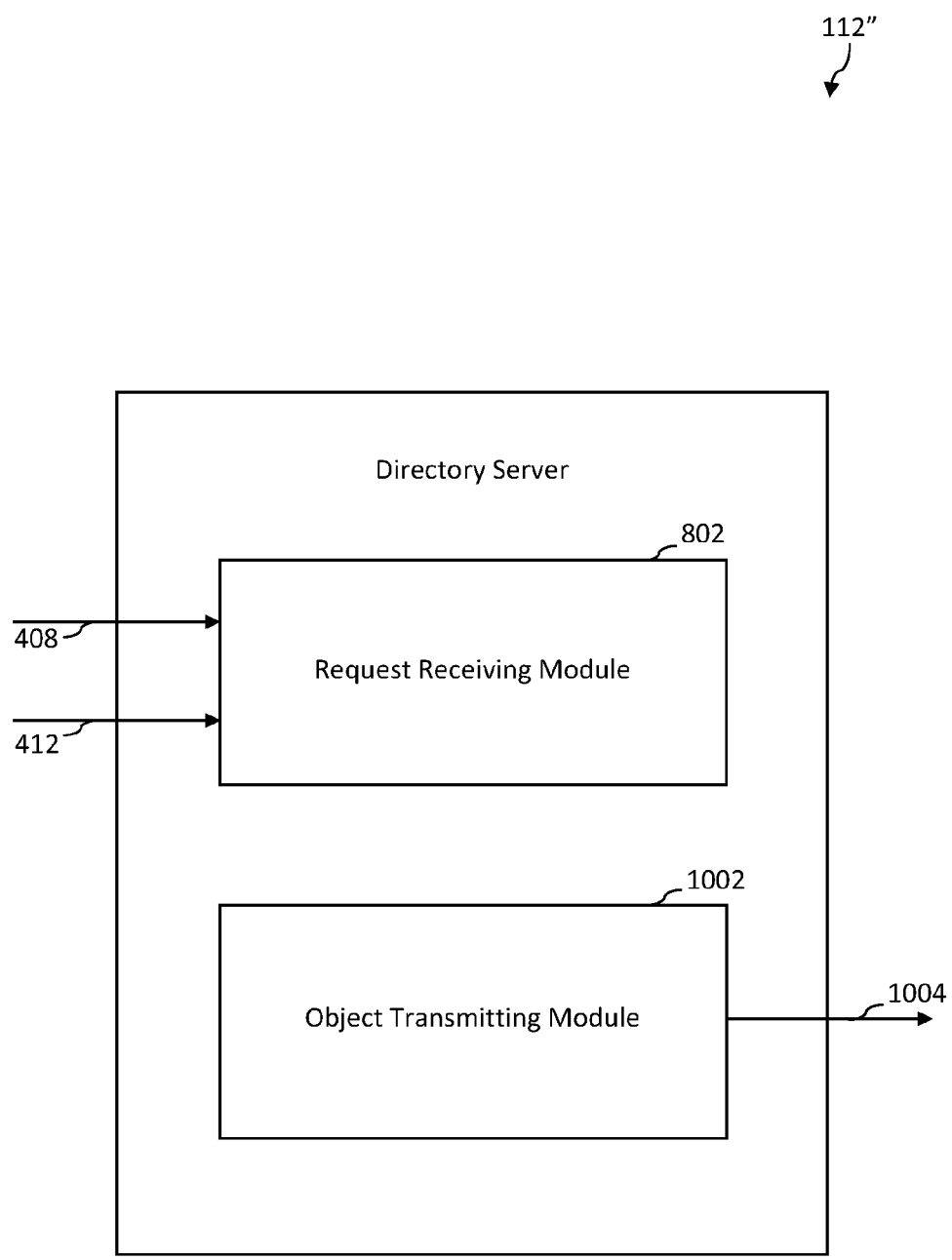
FIG. 10 is a block diagram of another example implementation of a directory server shown in FIG. 1 in accordance with an embodiment.

FIG. 9 depicts a flowchart 900 of a method for providing objects represented using XML from a directory server in accordance with a SOAP-based Web service protocol in accordance with an embodiment. Flowchart 900 may be performed by a directory server 112 of system 100 shown in FIG. 1, for example. For illustrative purposes, flowchart 900 is described with respect to a directory server 112" shown in FIG. 10, which is an example of directory server 112, according to an embodiment. As shown in FIG. 10, directory server 112" includes a request receiving module 802 and an object transmitting module 1002. Further structural and operational embodiments will be apparent to persons skilled in the relevant art(s) based on the discussion regarding flowchart 900. Flowchart 900 is described as follows.

As shown in FIG. 9, the method of flowchart 900 begins at step 902. In step 902, an object request is received at the directory server. The object request uses a first XML element including a query filter to select one or more directory objects based on one or more criteria in accordance with a SOAP-based Web service protocol. In an example implementation, request receiving module 802 of directory server 112" may receive an object request 408.

At step 904, a sorting request is received at the directory server. The sorting request uses a second XML element that is distinct from the first XML element to sort the one or more directory objects. In an example implementation, receiving module 802 may receive a sorting request 412.

At step 906, the one or more directory objects are transmitted to an entity in an order specified by the sorting request. In an example implementation, object transmitting module 1002 may transmit one or more directory objects 1004 to the entity. The entity may be a client 102 shown in FIG. 1, for example.

Figure 11:
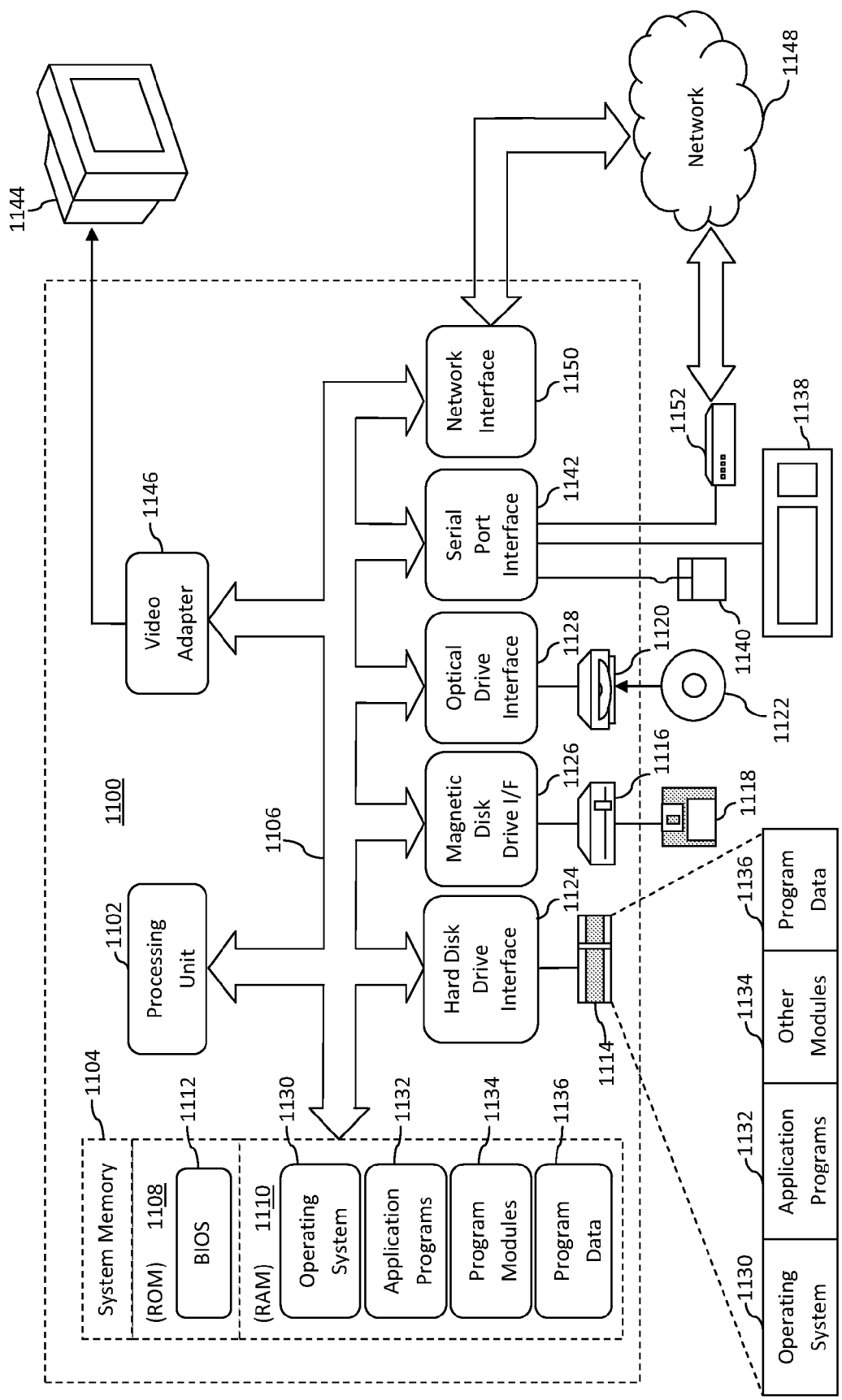
FIG. 11 depicts an example computer that may be used to implement various aspects of the embodiments.

FIG. 11 depicts an example computer 1100 that may be used to implement various aspects of the embodiments. Any one of the clients 102a-102n, directory server 112, or directory 114 shown in FIG. 1 (or any one or more subcomponents thereof shown in FIGS. 2, 4, 6, 8, and 10) may be implemented using computer 1100, including one or more features of computer 1100 and/or alternative features.

Computer 1100 may be a general-purpose computing device in the form of a conventional personal computer, a mobile computer, or a workstation, for example, or computer 1100 may be a special purpose computing device. The description of computer 1100 provided herein is provided for purposes of illustration, and is not intended to be limiting. Embodiments may be implemented in further types of computer systems, as would be known to persons skilled in the relevant art(s).

As shown in FIG. 11, computer 1100 includes a processing unit 1102, a system memory 1104, and a bus 1106 that couples various system components including system memory 1104 to processing unit 1102. Bus 1106 represents one or more of any of several types of bus structures, including a memory bus or memory controller, a peripheral bus, an accelerated graphics port, and a processor or local bus using any of a variety of bus architectures. System memory 1104 includes read only memory (ROM) 1108 and random access memory (RAM) 1110. A basic input/output system 1112 (BIOS) is stored in ROM 1108.

Computer 1100 also has one or more of the following drives: a hard disk drive 1114 for reading from and writing to a hard disk, a magnetic disk drive 1116 for reading from or writing to a removable magnetic disk 1118, and an optical disk drive 1120 for reading from or writing to a removable optical disk 1122 such as a CD ROM, DVD ROM, or other optical media. Hard disk drive 1114, magnetic disk drive 1116, and optical disk drive 1120 are connected to bus 1106 by a hard disk drive interface 1124, a magnetic disk drive interface 1126, and an optical drive interface 1128, respectively. The drives and their associated computer-readable media provide nonvolatile storage of computer-readable instructions, data structures, program modules and other data for the computer. Although a hard disk, a removable magnetic disk and a removable optical disk are described, other types of computer-readable media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1130, one or more application programs 1132, other program modules 1134, and program data 1136. Application programs 1132 or program modules 1134 may include, for example, computer program logic for implementing application 202, client Web services interface 204, client extension logic 206, server Web services interface 208, directory service logic 210, server extension logic 212, object request module 402, selection request module 404, sorting request module 406, request receiving module 802, attribute transmitting module 804, object transmitting module 1002, flowchart 300 (including any step of flowchart 300), flowchart 500 (including any step of flowchart 500), flowchart 700 (including any step of flowchart 700), and/or flowchart 900 (including any step of flowchart 900), as described herein.

A user may enter commands and information into the computer 1100 through input devices such as keyboard 1138 and pointing device 1140. Other input devices (not shown) may include a microphone, joystick, game pad, satellite dish, scanner, or the like. These and other input devices are often connected to the processing unit 1102 through a serial port interface 1142 that is coupled to bus 1106, but may be connected by other interfaces, such as a parallel port, game port, or a universal serial bus (USB).

A monitor 1144 or other type of display device is also connected to bus 1106 via an interface, such as a video adapter 1146. In addition to the monitor, computer 1100 may include other peripheral output devices (not shown) such as speakers and printers.

Computer 1100 is connected to a network 1148 (e.g., the Internet) through a network interface or adapter 1150, a modem 1152, or other means for establishing communications over the network. Modem 1152, which may be internal or external, is connected to bus 1106 via serial port interface 1142.

As used herein, the terms "computer program medium" and "computer-readable medium" are used to generally refer to media such as the hard disk associated with hard disk drive 1114, removable magnetic disk 1118, removable optical disk 1122, as well as other media such as flash memory cards, digital video disks, random access memories (RAMs), read only memories (ROM), and the like.

As noted above, computer programs and modules (including application programs 1132 and other program modules 1134) may be stored on the hard disk, magnetic disk, optical disk, ROM, or RAM. Such computer programs may also be received via network interface 1150 or serial port interface 1142. Such computer programs, when executed or loaded by an application, enable computer 1100 to implement features of embodiments discussed herein. Accordingly, such computer programs represent controllers of the computer 1100.

Embodiments are also directed to computer program products comprising software stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

Embodiments described herein have a variety of benefits, as compared to conventional WS-Enumeration enumeration techniques. For example, embodiments may advantageously reduce the network bandwidth consumed and/or the time associated with performing enumeration in accordance with the WS-Enumeration protocol. Embodiments enable a client to provide selection requests, so that the client may control the scope and size of the resources received during enumeration. Embodiments enable the client to provide sorting requests, so that the client may control the order of the received resources. Embodiments enable a directory server to interpret the selection and/or sorting requests, so that the directory server may provide the requested resources accordingly. Embodiments enable different computer languages to be used for object requests, selection requests, and sorting requests.

V. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A computer-implemented method for requesting resources represented using extensible markup language (XML) from a directory server in accordance with a simple object access protocol-based (SOAP-based) Web service protocol, comprising:

providing an object request to the directory server using a first XML element that includes a query filter to select one or more directory objects based on one or more criteria in accordance with the SOAP-based Web service protocol;

providing a selection request to the directory server using a second XML element that is distinct from the first XML element to select at least one attribute of each of the one or more directory objects to be received as one or more respective resources in response to the object request; and providing a sorting request to the directory server using a third XML element that is distinct from the first XML element and the second XML element to sort the one or more resources to be received in response to the object request.

2. The method of claim 1, wherein providing the object request includes providing the object request to the directory server using the first XML element that is based on a first computer language; and wherein providing the selection request includes providing the selection request to the directory server using the second XML element that is based on a second computer language that is different from the first computer language.

3. The method of claim 1, wherein providing the object request includes providing the object request to the directory server using the first XML element that is based on a first computer language; and wherein providing the sorting request includes providing the sorting request to the directory server using the third XML element that is based on a second computer language that is different from the first computer language.

4. The method of claim 3, wherein providing the selection request includes providing the selection request to the directory server using the second XML element that is based on a third computer language that is different from the first computer language and the second computer language.

5. The method of claim 1, wherein providing the sorting request comprises:

providing the sorting request to the directory server using the third XML element to sort the one or more resources in ascending order with respect to at least one attribute of the corresponding one or more directory objects.

6. The method of claim 1, wherein providing the sorting request comprises:

providing the sorting request to the directory server using the third XML element to sort the one or more resources in descending order with respect to at least one attribute of the corresponding one or more directory objects.

7. The method of claim 1, wherein providing the sorting request comprises:

providing the sorting request to the directory server using the third XML element to sort the one or more resources based on a designated attribute of each of the one or more directory objects corresponding to the one or more respective resources.

8. The method of claim 7, wherein the designated attribute of each of the one or more directory objects is included in the at least one attribute of each of the one or more directory objects to be received as the one or more respective resources in response to the object request.

9. The method of claim 7, wherein the designated attribute of each of the one or more directory objects is not included in the at least one attribute of each of the one or more directory objects to be received as the one or more respective resources in response to the object request.

10. A computer-implemented method for requesting objects represented using extensible markup language (XML) from a directory server in accordance with a simple object access protocol-based (SOAP-based) Web service protocol, comprising:

providing an object request to the directory server using a first XML element that includes a query filter to select one or more directory objects based on one or more criteria in accordance with the SOAP-based Web service protocol; and providing a sorting request to the directory server using a second XML element that is distinct from the first XML element to sort the one or more directory objects to be received in response to the object request.

11. The method of claim 10, wherein providing the object request includes providing the object request to the directory server using the first XML element that is based on a first computer language; and wherein providing the sorting request includes providing the sorting request to the directory server using the second XML element that is based on a second computer language that is different from the first computer language.

12. The method of claim 10, wherein providing the sorting request comprises:

providing the sorting request to the directory server using the second XML element to sort the one or more directory objects in ascending order with respect to at least one attribute of the one or more directory objects.

13. The method of claim 10, wherein providing the sorting request comprises:

providing the sorting request to the directory server using the second XML element to sort the one or more directory objects in descending order with respect to at least one attribute of the one or more directory objects.

14. The method of claim 10, wherein providing the sorting request comprises:

providing the sorting request to the directory server using the second XML element to sort the one or more directory objects based on an attribute of each of the one or more directory objects.

15. A computer-implemented method for providing resources represented using extensible markup language (XML) from a directory server to an entity over a network in accordance with a simple object access protocol-based (SOAP-based) Web service protocol, comprising:

receiving an object request at the directory server that uses a first XML element including a query filter to select one or more directory objects based on one or more criteria in accordance with the SOAP-based Web service protocol;

receiving a selection request at the directory server that uses a second XML element that is distinct from the first XML element to select at least one attribute of each of the one or more directory objects; and transmitting the at least one attribute of each of the one or more directory objects as one or more respective resources to the entity in response to receiving the object request and the selection request; and receiving a sorting request at the directory server that uses a third XML element that is distinct from the first XML element and the second XML element to sort the one or more resources;

wherein transmitting includes transmitting the at least one attribute of each of the one or more directory objects as one or more respective resources sorted in accordance with the sorting request.

16. The method of claim 15, wherein transmitting includes transmitting the at least one attribute of each of the one or more directory objects as one or more respective resources sorted in ascending order.

17. The method of claim 15, wherein transmitting includes transmitting the at least one attribute of each of the one or more directory objects as one or more respective resources sorted in descending order.

18. The method of claim 15, wherein transmitting includes transmitting the at least one attribute of each of the one or more directory objects as one or more respective resources sorted based on a designated attribute of each of the one or more directory objects corresponding to the one or more respective resources.

* * * * *